(12) United States Patent
Zhang et al.

(10) Patent No.: US 9,237,047 B1
(45) Date of Patent: Jan. 12, 2016

(54) CIRCUITS FOR AND METHODS OF RECEIVING DATA IN AN INTEGRATED CIRCUIT

(71) Applicant: Xilinx, Inc., San Jose, CA (US)

(72) Inventors: Hongtao Zhang, San Jose, CA (US);
Geoffrey Zhang, San Jose, CA (US);
Patrick Satarzadeh, San Jose, CA (US);
Zhaoyin D. Wu, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/689,294

(22) Filed: Apr. 17, 2015

(51) Int. Cl.
*H04L 27/06* (2006.01)
*H04B 1/12* (2006.01)

(52) U.S. Cl.
CPC ............... *H04L 27/06* (2013.01); *H04B 1/123* (2013.01)

(58) Field of Classification Search
USPC ............... 375/317, 326, 295; 455/232.1, 126, 455/102, 75
See application file for complete search history.

(56) References Cited

U.S. PATENT DOCUMENTS

| | | | | |
|---|---|---|---|---|
| 6,700,441 B1* | 3/2004 | Zhang | ................... | H03F 1/3235 330/151 |
| 7,103,329 B1* | 9/2006 | Thon | ........................ | H03C 5/00 330/151 |
| 8,626,098 B1* | 1/2014 | Livezey | ............... | H03G 3/3068 330/253 |
| 2006/0293009 A1* | 12/2006 | Kobayashi | ........... | H03G 3/3036 455/232.1 |
| 2009/0156142 A1* | 6/2009 | Matsuura | ............. | H04B 1/0475 455/102 |
| 2009/0251617 A1* | 10/2009 | Hyakudai | ............... | H04B 17/21 348/726 |
| 2010/0151800 A1* | 6/2010 | Akita | ................. | H04W 52/0238 455/75 |
| 2012/0224657 A1* | 9/2012 | Sasaki | .................. | H04L 27/2273 375/326 |
| 2015/0139352 A1* | 5/2015 | Matsuo | ................... | H01Q 3/267 375/295 |

* cited by examiner

*Primary Examiner* — Eva Puente
(74) *Attorney, Agent, or Firm* — John J. King

(57) ABSTRACT

A circuit for receiving data in an integrated circuit is described. The circuit comprises a receiver configured to receive an input signal and to generate output data based upon the input signal, the receiver having a level detection circuit coupled to receive the input signal; and a calibration circuit coupled to the receiver, the calibration circuit having an input for receiving the input signal; an error detection circuit coupled to the input, the error detection circuit coupled to receive the input signal, a first reference voltage and a second reference voltage; and a control circuit coupled to an output of the error detection circuit, wherein the control circuit selectively generates either an offset control signal or an amplitude control signal based upon comparisons of the input signal to the first reference voltage and the second reference voltage. A method of receiving data is also disclosed.

20 Claims, 8 Drawing Sheets

| | Second Error Signal > 0 | Second Error Signal < 0 |
|---|---|---|
| First Error Signal > 0 | Case 1: Baseband wander >0 Negative Correction needed | Case 3: Amplitude too big Reduce Amplitude |
| First Error Signal < 0 | Case 4: Amplitude too small Increase Amplitude | Case 2: Baseband wander < 0 Positive Correction needed |
FIG. 5
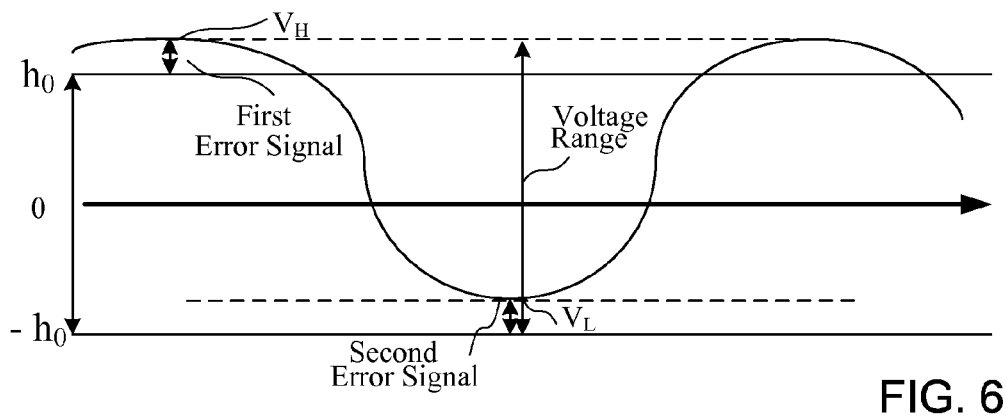
FIG. 6
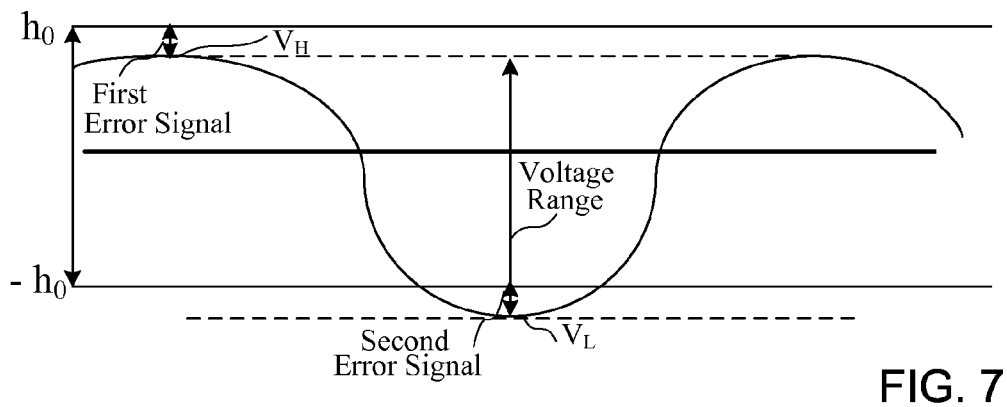
FIG. 7

US 9,237,047 B1

CIRCUITS FOR AND METHODS OF RECEIVING DATA IN AN INTEGRATED CIRCUIT

FIELD OF THE INVENTION

The present invention relates generally to integrated circuit devices, and in particular, to circuits for and methods of receiving data in an integrated circuit.

BACKGROUND OF THE INVENTION

Data communication is an important function of many integrated circuits. For alternating current (AC) signals coupled to wireline communication systems, low frequency signals from a transmitter are filtered out by the AC capacitor, resulting in a dynamic common mode variation at a receiver. This variation is called baseline wander, and its magnitude depends on the bit pattern history, channel loss, and the time constant associated with the AC capacitor. If the input signal is not adjusted to compensate for the baseline wander, the received eye margin is reduced and bit error rate (BER) is increased.

Various baseline wander correction techniques have been implemented in the past. One adaptive technique involves passing the received history bits through an analog low pass filter or a digital infinite impulse response (IIR) filter, and subtracting the output from the received signal before detection. However, the bandwidth and the gain of these filters are difficult to determine, and adaptation of the bandwidth and gain parameters is challenging. Manual sweeping can be costly and time consuming, as the accurate values of the bandwidth and the gain depend on the transmitter and receiver settings, channel property and the process, voltage, temperature (PVT) variations of the channel, transmitter and receiver. Another adaptive technique uses the data crossing information for baseline wander correction. However, it requires a sampling rate of twice the speed of the data rate, and therefore consumes more power than baud rate sampling.

Accordingly, improved circuits and methods of receiving data in an integrated circuit are beneficial.

SUMMARY OF THE INVENTION

A circuit for receiving data in an integrated circuit is described. The circuit comprises a receiver configured to receive an input signal and to generate output data based upon the input signal, the receiver having a level detection circuit coupled to receive the input signal; and a calibration circuit coupled to the receiver, the calibration circuit having an input for receiving the input signal; an error detection circuit coupled to the input, the error detection circuit coupled to receive the input signal, a first reference voltage and a second reference voltage; and a control circuit coupled to an output of the error detection circuit, wherein the control circuit selectively generates either an offset control signal or an amplitude control signal based upon comparisons of the input signal to the first reference voltage and the second reference voltage.

Another circuit for receiving data in an integrated circuit comprises a receiver configured to receive an input signal and to generate output data based upon the input signal, the receiver having a level detection circuit coupled to receive the input signal; and a calibration circuit coupled to the receiver, the calibration circuit having an input for receiving the input signal; an error detector coupled to the input, the error detector coupled to receive the input signal and a reference voltage; a selection circuit coupled to receive a plurality of reference voltages, wherein the reference voltage coupled to the error detector is generated at an output of the selection circuit; and a control circuit coupled to an output of the error detector.

A method of receiving data in an integrated circuit is also described. The method comprises receiving an input signal at a receiver; coupling the input signal to a level detection circuit and an error detection circuit; generating a first output of the error detection circuit, wherein the first output of the error detection circuit is based upon a comparison of the input signal and a first reference voltage; generating a second output of the error detection circuit, wherein the second output of the error detection circuit is based upon a comparison of the input signal and a second reference voltage; coupling the outputs of the level detection circuit and the first and second outputs of the error detection circuit to a control circuit; and selectively generating either an offset control signal or an amplitude control signal based upon the first and second outputs of the error detection circuit.

BRIEF DESCRIPTION OF THE DRAWINGS

FIG. 5 is a table showing different cases associated with baseline wander which are corrected by the receiver of FIGS. 3 and 4;

FIG. 6 is a diagram showing baseline wander according to a first case;

FIG. 7 is a diagram showing baseline wander according to a second case;

DETAILED DESCRIPTION OF THE DRAWINGS

The circuits and methods set forth below provide an adaptive algorithm which can be used for baseline wander correction in AC coupled communication systems. The circuits and methods provide a flexible response time and add little cost to the existing hardware which would otherwise be used to receive an AC input signal. More particularly, adaptive baseline wander correction is provided by detecting asymmetrical error signals with respect to two reference voltages. Only a single error detection circuit is required to determine whether a modulated input signal has an undesirable offset or the amplitude of the input signal needs to be adjusted. The circuits and methods can be used for both baud rate sampling, such as when using an NRZ receiver, and double rate sampling, such as when using a pulse amplitude modulation 4 (PAM4) receiver.

For example, a circuit for receiving data may comprise a calibration circuit having an error detection circuit coupled to receive an input signal and first and second reference voltages. A control circuit coupled to outputs of the error detection circuit selectively generates either an offset control signal or an amplitude control signal based upon comparisons of the input signal to the first and second reference voltages. That is, the input signal is compared to two different reference values at different points in time, and based upon the differences between the input signal ant the two reference values, a determination is made whether a correction is necessary, and whether to generate an offset control signal or an amplitude control signal.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
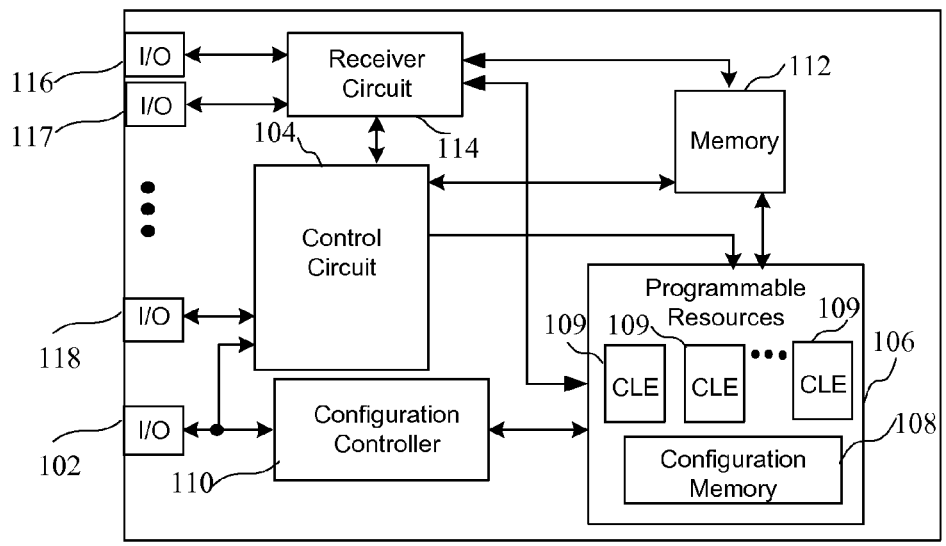
FIG. 1 is a block diagram of a circuit that enables receiving an input signal to generate output data.

Turning first to FIG. 1, a block diagram of an integrated circuit that enables receiving an input signal to generate output data is shown. In particular, an input/output port 102 is coupled to a control circuit 104 that controls programmable resources 106 having configuration memory 108. Configuration data may be provided to the configuration memory 108 by a configuration controller 110. The configuration data enables the operation of configurable elements 109. A memory 112 may be coupled to the control circuit 104 and the programmable resources 106. A receiver circuit 114 may be coupled to the control circuit 104, programmable resources 106 and the memory 112, and may receive signals external to the integrated circuit device by way of an I/O port 116 and an I/O port 117. Other I/O ports may be coupled to circuits of the integrated circuit device, such as I/O port 118 that is coupled to the control circuit 104 as shown. The circuits and methods described in more detail below may be implemented by various elements of the circuit of FIG. 1. For example, the receiver of FIGS. 3, 4, 13 and 14 may be implemented in the receiver circuit 114, and the calibration circuit of FIGS. 3, 4, 13 and 14 may also be implemented in the receiver, or may be implemented in the control circuit 104 or the programmable resources 106, for example.

Figure 2:
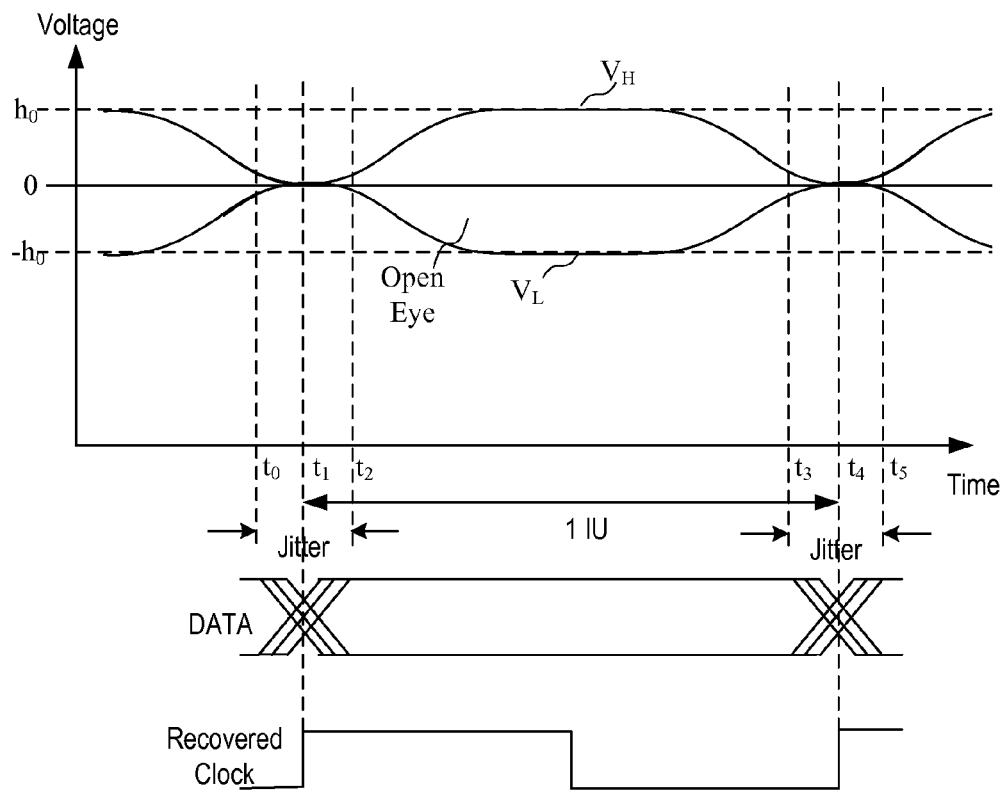
FIG. 2 is an eye diagram showing characteristics for non-return-to-zero (NRZ) data received by a data receiver.

Before describing baseline wander of a received AC signal that requires correction, an eye diagram showing characteristics for a received signal will be described in reference to FIG. 3. While the example of FIG. 3 relates to a non-return-to-zero data signal (i.e. a signal varying symmetrically between a positive voltage and a negative voltage), it should be understood that the circuits and methods set forth below could relate to any type of varying input signal, such as a PAM4 signal as will be described in more detail in reference to FIGS. 12-15. A received AC signal is typically defined by an "eye pattern," where it is desirable to have a large "open eye" portion so that a detected value at a given time in the middle of the eye pattern (i.e. between jitter on either ends of the eye pattern) can easily be detected as being associated with an expected voltage at the top or bottom of the eye pattern. The received data signal of FIG. 2 represents an NRZ input signal that is symmetrical about zero volts, where the expected value at the top of the eye pattern (i.e. a logical "1") is represented by $h_0$, and the expected value at the bottom of the eye pattern (i.e. a logical "0") is represented by $-h_0$. The beginning of the unit interval (i.e. the period between time $t_1$ and $t_4$) of the received data is at time $t_1$, where jitter may generally be detected between $t_0$ and $t_2$. The data is preferably detected at the center of the eye pattern (shown by the falling edge of the recovered clock signal approximately half way between $t_2$ and $t_3$) where jitter can be expected to be received in another jitter period between $t_3$ and $t_5$. While the eye pattern of FIG. 2 represents an ideal eye pattern, where the voltage level $V_H$ detected at the top of the eye pattern has a positive voltage value of $h_0$, and the voltage level $V_L$ detected at the bottom of the eye pattern has a negative voltage value of $-h_0$, it should be noted that the typical eye pattern for received data over time varies. Therefore, the sharp line representing the eye pattern would be more represented by a much wider pattern representing variations in the detected values over time.

However, there are cases where the received input signal either has an offset or has an amplitude which is too large or too small. As will be described in reference to the table of FIG. 5, a determination of whether a received data signal either has an undesirable offset or amplitude can be made by based upon two detected values, $V_H$ and $V_L$, and more particularly how they relate to reference values. That is, each of $V_H$ and $V_L$ may be either greater than or less than a corresponding reference value, leading to the four possible cases shown in FIGS. 6-9. A single control signal can then be generated to compensate for either an offset or an incorrect amplitude of the input signal.

Figure 3:
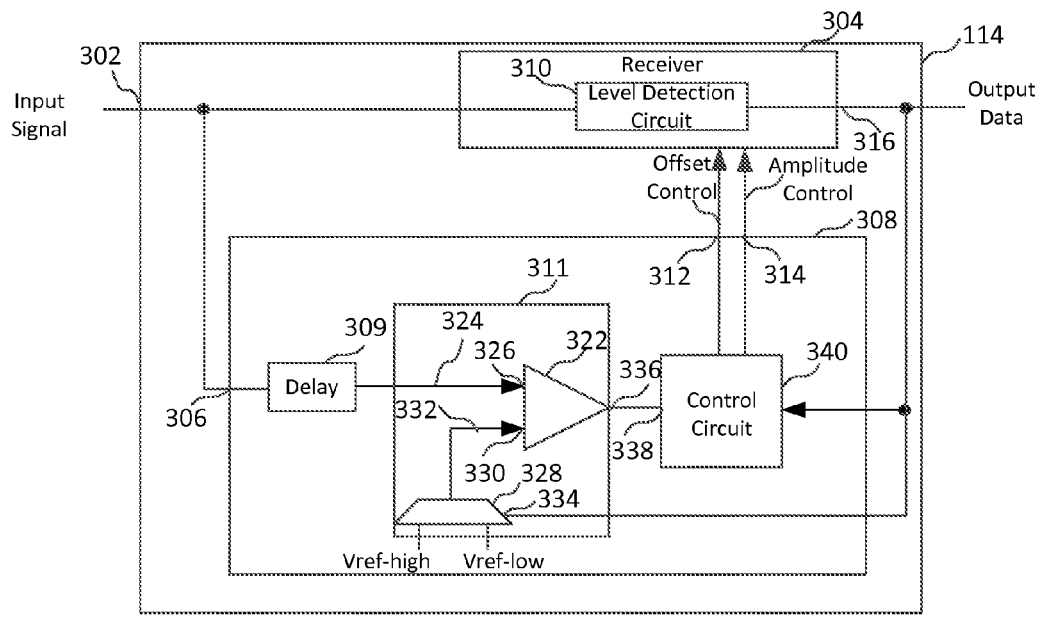
FIG. 3 is a block diagram of a receiver circuit of FIG. 1.

Turning now to FIG. 3, a block diagram of the receiver circuit 114 of FIG. 1 is shown. The receiver circuit 114 comprises an input 302 for receiving an input signal. The input 302 may be coupled to an I/O port of FIG. 1, such as I/O port 116 or I/O port 117 for example. The input signal is routed to a receiver 304, which may be any type of receiver, and particularly may be a receiver for receiving NRZ signals or PAM4 signals as will be described in more detail below. The input signal is also coupled to an input 306 of a calibration circuit 308. A delay element 309 is provided between the input signal and an error detection circuit 311 to ensure that the correct value of the input signal is coupled to the error detection circuit 311 at the correct time. That is, because a level detection circuit 310 of the receiver 304 provides a delay in generating the output data, it is necessary to delay the input signal to the calibration circuit 311 to ensure that the value of the input signal coupled to an error detector and compared to a reference signal corresponds to the correct output data detected by the level detection circuit 310 and generated at an output 316 of the receiver. As described in more detail below, an offset control signal may be generated at an output 312, or an amplitude control signal may be generated at an output 314.

The error detection circuit 311 comprises an error detector 322, and receives a delayed inputs signal (corresponding to the output signal delayed by the level detection circuit 310) by way of a signal line 324, which is coupled to a first input 326 of the error detector 322. A selection circuit 328, shown here as a multiplexer, is coupled to a second input 330 by way of a signal line 332. A control line 334 is coupled to receive the output data, which selects the appropriate reference voltage (Vref-high or Vref-low). That is, if the detected output signal (delayed by the level detection circuit 310) is a high output, the high output is coupled to the control line 334 and used to select the Vref-high value to be coupled to the second input 330 the error detector 322, which also receives a delayed input signal. The determination of the error (i.e. whether the input signal is greater than or less than the selected reference signal) generated at an output 336 is coupled to an input 338 of a control circuit 340. The control circuit 340 then generates control signals, including an offset control signal at the output 312 and an amplitude control at the output 314, based upon detected voltage levels of the output data.

More particularly the selection circuit 328, shown here as a multiplexer, is coupled to receive first and second reference voltages Vref-high and Vref-low associated with expected values at the top and bottom of the eye pattern. A control signal on a control line 334 is coupled to control the selection circuit 328 to generate an appropriate value at the first or second input of selection circuit 328 to the error detector 322. That is, the level detection circuit 310 will determine whether a detected value is associated with the top or bottom of the eye pattern (i.e. is closer to either $h_0$ or $-h_0$,) by providing either a logical "0" or a logical "1", and therefore provide a control signal on control line 334 to select the appropriate input to the selection circuit (i.e. either Vref-high or Vref-low). An output of the error detector 322 is then provided to the input 338 of the control circuit 340.

The control signal on the control line 334 is also coupled to the control circuit to enable the control circuit to generate the appropriate offset control signal or amplitude control signal. The control circuit 340 will generate an offset control signal or an amplitude control signal based upon the detected output data (i.e. whether the output data is a high or low value) and a comparison of the input signal with the high reference value or the low reference value. As will be described in more detail below in reference to the table of FIG. 5, a detected signal associated with the top of an eye pattern and a detected signal associated with the bottom of an eye pattern enable determining whether to generate a control signal, and more particularly, one of an offset control signal and an amplitude control signal. That is, the relationships between an input signal and both a first reference signal and a second reference signal are used to determine whether the input signal is offset, or an amplitude adjustment is necessary, as will be described in more detail in reference to FIGS. 5-10.

Figure 4:
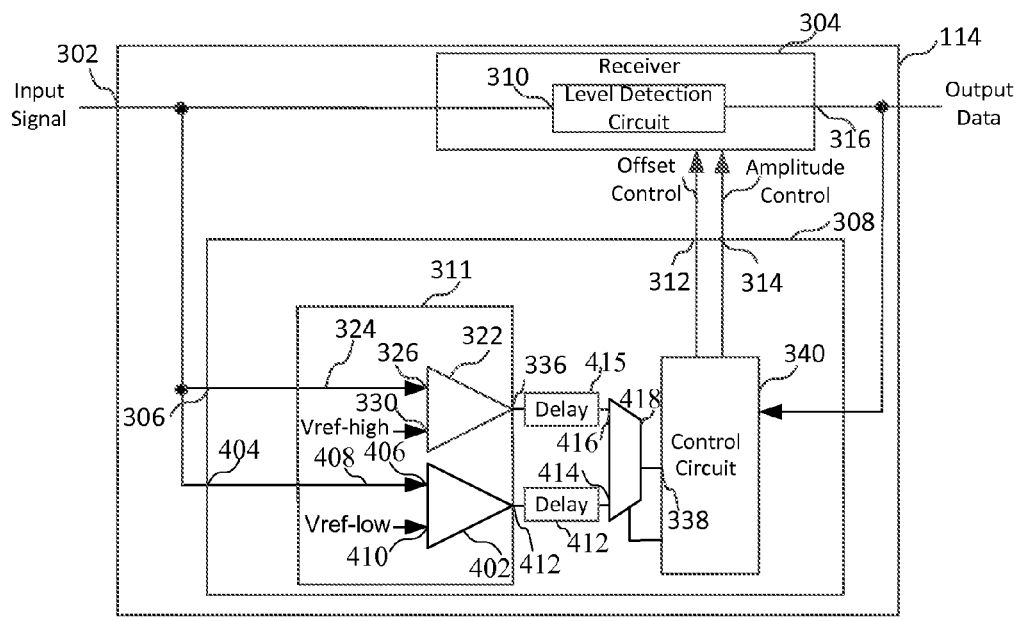
FIG. 4 is a block diagram of a receiver circuit of FIG. 1 having multiple error detectors of an error detection circuit.

Before describing the different relationships between the input signal and the reference signals, it should be noted that separate error detectors can be implemented for the separate reference voltages, as shown in the circuit of FIG. 4. In addition to the error detector 322, a second error detector 402 is coupled, at a second input 404, to receive the input signal which is coupled to an input 406 by way of a signal line 408. The high level reference voltage (Vref-high) is coupled to the second input 330 of the first error detector 322 to enable a comparison of a value of the input signal determined to be near the high level reference voltage level, while the low level reference voltage (Vref-low) is coupled to the second input 410 of the second error detector 402 to enable a comparison of a value of the input signal determined to be near the low level reference voltage level. An output 412 of the second error detector 402 is coupled by a signal line (having a delay element 413) to another input 414 of the control circuit 340. A delay element 415 is also provided between the output 336 and a second input 416 of a selection circuit 418, shown here as a multiplexer. The control circuit 340 select the appropriate input to the selection circuit 418 based upon the value of the output data as described above in reference to FIG. 3. The control circuit can then generate an appropriate control signal based upon outputs of the first error detector 322 and the second error detector 402. While a single delay could be implemented for the inputs to the error detection circuit 311, delay elements 412 and 415 are preferably provided after the error detectors 322 and 402. That is, it is generally easier to delay the digital outputs of the error detectors than the analog input signal provided to the error detection circuit.

The first and second error detectors 322 and 402 comprise comparators, where an output of a logical "0" is generated if the reference voltage is greater than the detected voltage, and a logical "1" is generated if the reference voltage is less than the detected voltage, for example. As will be described in more detail below, the detected amplitudes $V_H$ and $V_L$ represent a detected high and low levels of a received signal detected at the top and bottom of an eye pattern for the received data, while the high level reference value (Vref-high) and the low level reference value (Vref-low) represent desired voltages for the top and bottom of the eye pattern, represented below in FIGS. 6-10 by $h_0$ and $-h_0$. As will be described in more detail below, the control circuit 340 will generate an offset control signal or an amplitude control signal to either correct the offset in a received signal by shifting the received signal up or down, or correct the amplitude of the received signal.

In a typical high speed wireline system, the error signal is the difference between the received signal (after equalization) and the expected signal, as shown in FIG. 6. The circuit of FIGS. 3 and 4 compare the difference between the detected signal $V_H$ and $h_0$ (where Vref-high is equal to $h_0$) and the detected signal $V_L$ from $-h_0$ (where Vref-low is equal to $-h_0$), and determines if the difference between the signals is positive or negative. That is, the error detector 322 generates a first error signal represented by ($V_H$-Vref-high), which has a value and a sign. That is, if the difference $V_H$-Vref-high is non-zero and positive, than $V_H$ is greater than $h_0$, as shown in FIG. 6. Similarly, the error detector 322 (or error detectors 322 and 402 of FIG. 4) generates a second error signal represented by ($V_L$-Vref-low), which has a value and a sign. Therefore, if the difference $V_L$-Vref-low is non-zero and positive, than $V_L$ is greater than $-h_0$ (i.e. less negative) as also shown in FIG. 6.

Accordingly, case 1 in the table of FIG. 5 and shown in FIG. 6 indicates that both the first error signal and the second error signal (generated by the first and second error detectors 322 and 402, respectively) are positive, and that baseline wander is positive (i.e. the entire waveform has an undesirable positive offset, and therefore negative correction is required). Therefore, an offset signal is provided to the receiver to eliminate the undesirable offset and lead to the case of FIG. 10, where the detected voltage $V_H$ is equal to $h_0$ and the detected voltage $V_L$ is equal to $-h_0$.

Figure 10:
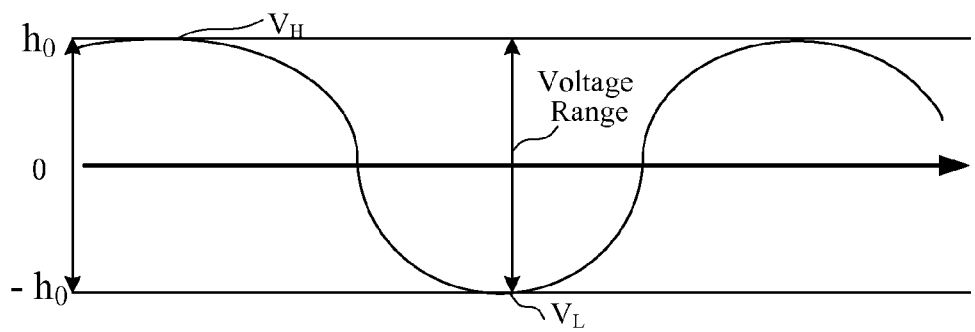
FIG. 10 is a diagram showing received data after baseline wander is corrected.

A negative offset can also exist as shown in FIG. 7, for example. That is, because the received signal magnitude $V_H$ is lower than $h_0$ when it is positive and also lower (i.e. more negative) than $-h_0$ when it is negative, baseline wander is deemed as negative and a positive correction is required. More particularly, if the difference $V_H$-Vref-high is non-zero and negative, than $V_H$ is less than $h_0$. Further, if the difference $V_L$-Vref-low is non-zero and negative, than $V_L$ is less than $-h_0$ as also shown in FIG. 7. Accordingly, case 2 as shown in FIG. 7 indicates that baseline wander is negative (i.e. the entire waveform has an undesirable negative offset), and therefore positive correction is required to lead to the output as shown in FIG. 10.

Figure 8:
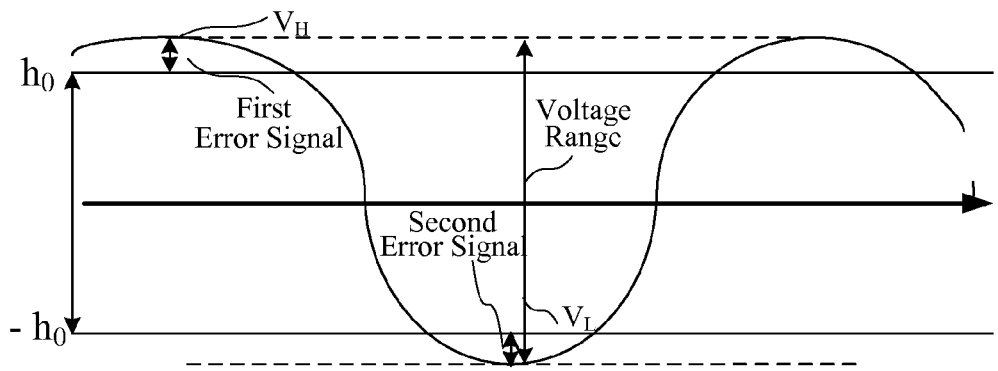
FIG. 8 is a diagram showing baseline wander according to a third case.
Figure 9:
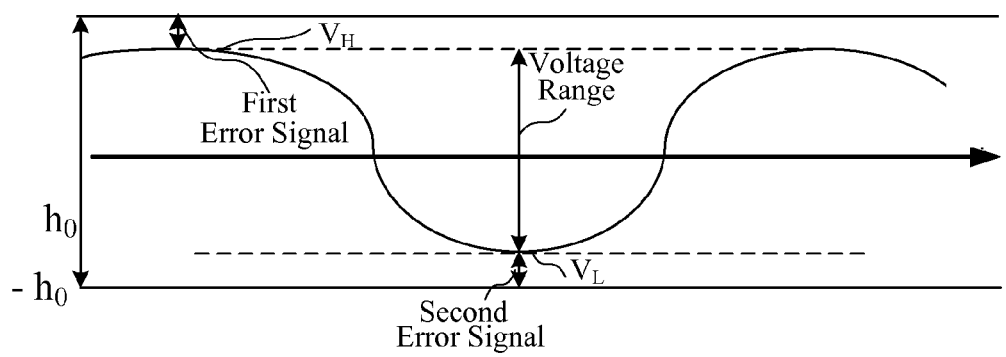
FIG. 9 is a diagram showing baseline wander according to a fourth case.

A condition can exist where the amplitude of the received signal is either too large or too small. For example, if the received signal magnitude is greater than $h_0$ when positive and less than $-h_0$ when negative as shown in FIG. 8 (i.e. case 3), baseline wander is deemed to be 0, but the amplitude of the signal needs to be decreased such that $V_H$ is equal to $h_0$ and $V_L$ is equal to $-h_0$. After the amplitude of the signal is decreased, $V_H$ will be equal to $h_0$ and $V_L$ will be equal to $-h_0$ as shown in FIG. 10. Similarly, if the received signal magnitude is less than $h_0$ when positive and greater than $-h_0$ when negative as shown in FIG. 9 (i.e. case 4), baseline wander is deemed to be 0, but the amplitude of the signal needs to be increased such that $V_H$ is equal to $h_0$ and $V_L$ is equal to $-h_0$ as shown in FIG. 10.

Accordingly, the only two error values need to be detected (i.e. one associated with a top of the eye pattern and the other associated with a bottom of the eye pattern) to make an appropriated determination of whether an improper offset condition exists or the amplitude of the input signal needs to be adjusted), and what action is necessary to adjust the received waveform so that the data can be properly received.

Figure 11:
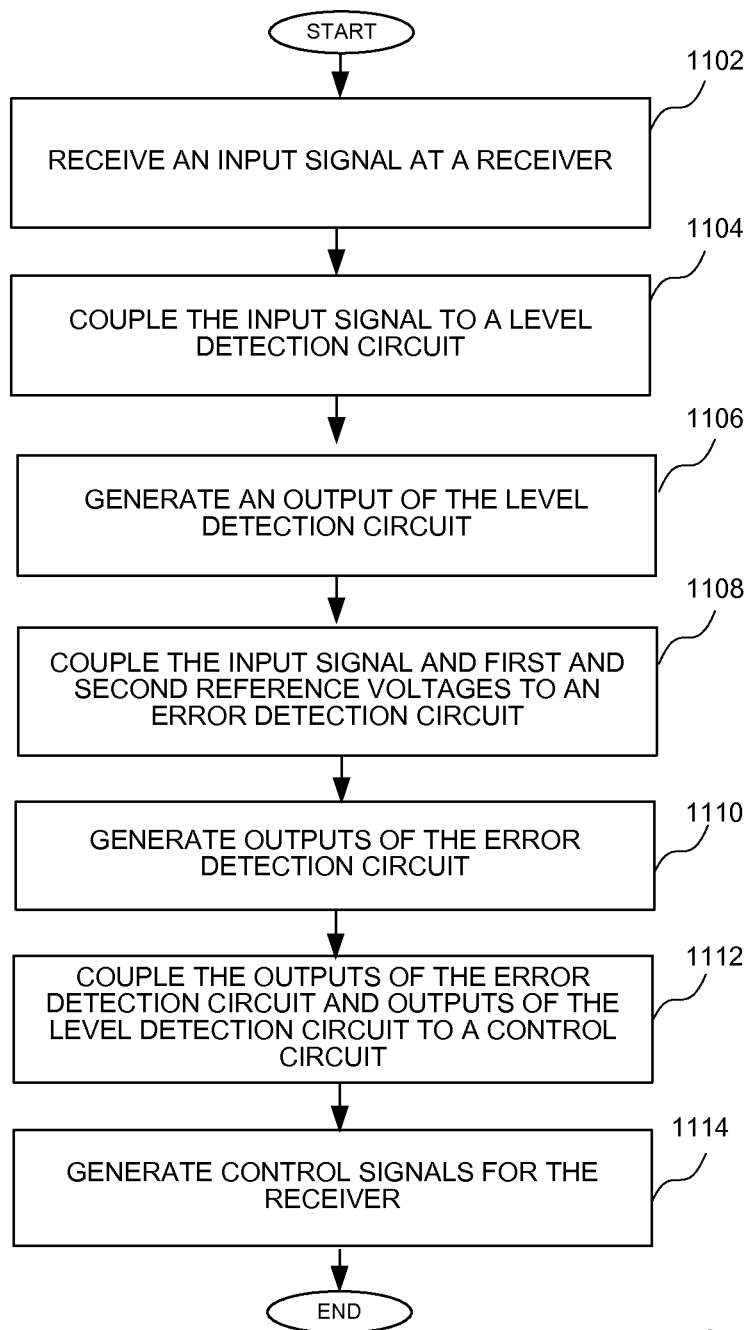
FIG. 11 is a flow chart showing a method of correcting baseline wander when receiving data.
Figure 13:
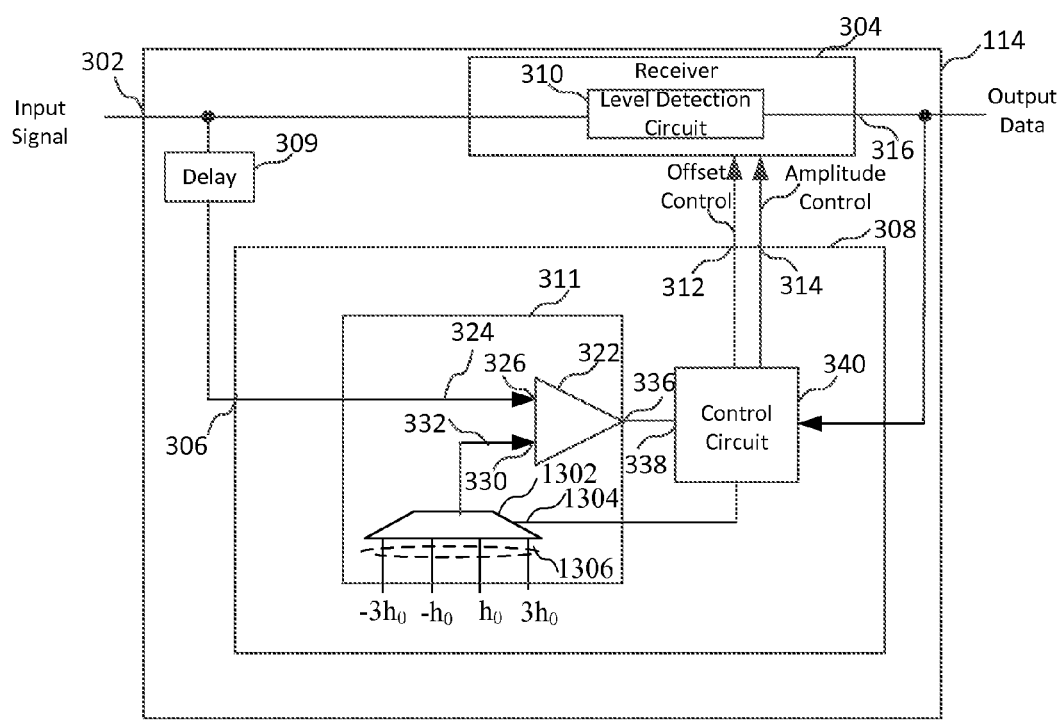
FIG. 13 is a block diagram of a circuit for correcting baseline wander in a circuit receiving PAM4 signals.
Figure 14:
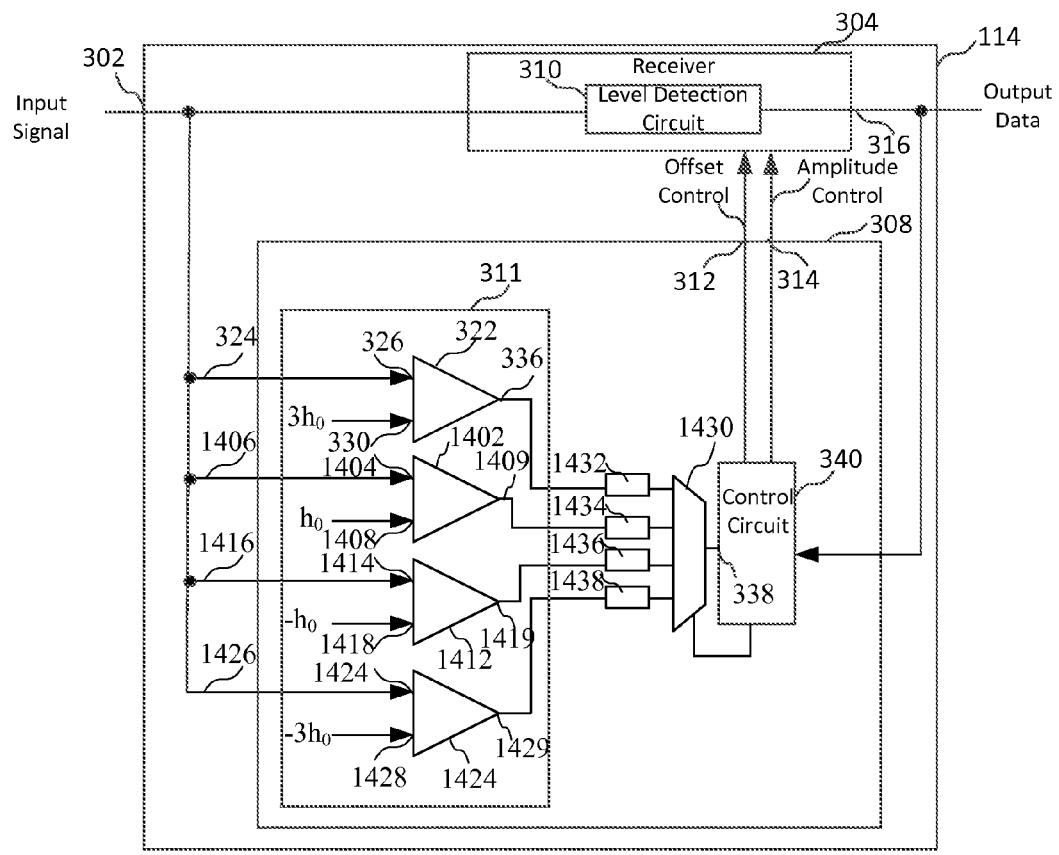
FIG. 14 is a block diagram of another circuit for correcting baseline wander in a circuit receiving PAM4 signals.

Turning now to FIG. 11, a flow chart shows a method of correcting baseline wander when receiving data. In particular, an input signal is received at a receiver at a block 1102, and is coupled to a level detection circuit at a block 1104. An output of the level detection circuit is generated at a block 1106. The output of the level detection circuit is used to select a correct reference voltage to compare to the input signal. The input signal and first and second reference voltages are coupled to an error detection circuit at a block 1108. Outputs of the error detection circuit are generated at a block 1110. Outputs of the error detection circuit and outputs of the level detection circuit are coupled to a control circuit at a block 1112. Control signals are generated for the receiver at a block 1114. That is, the control circuit can determine whether one of the conditions associated the 4 cases of FIG. 5 exists based upon outputs of the error detection circuit, and generates a control signal to provide the appropriate correction. More particularly, the control circuit 340 can generate either an offset control signal or an amplitude control signal based upon a comparison of the input signal to two reference voltages. It should be noted that the outputs of the error detection circuit could be generated by a single error detector as shown in FIGS. 3 and 13, or multiple error detectors as shown in FIGS. 4 and 14. It should be further noted that the method of FIG. 11 could be implemented with two reference voltages, as described in reference to FIGS. 3 and 4, or more reference voltages, as described in reference to FIGS. 13 and 14.

Figure 12:
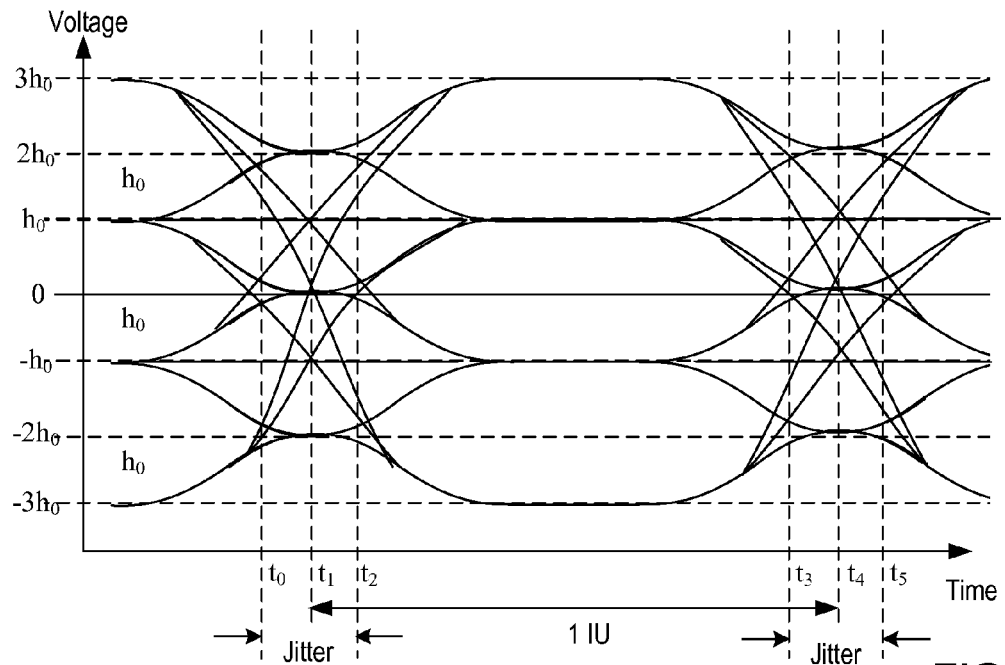
FIG. 12 is a diagram showing received data signals according to a PAM4 protocol.

While the circuit of FIGS. 3 and 4 apply to NRZ signaling, it should be understood that the circuit of FIGS. 3 and 4 could be adapted for PAM4 signaling schemes. As shown in FIG. 12, a diagram shows received data signals according to a PAM4 protocol, where the received voltage of the signal may have a value of $-3h_0$, $-h_0$, $h_0$ or $3h_0$. According to the PAM4 protocol, a single value can be used to generate two bits of data, where $-3h_0$ may be represent 00, $-h_0$ may represent 01, $h_0$ may represent 10, and $3h_0$ may represent 11.

In order to determine the appropriate value of a reference voltage to provide for a comparison with a detected value when implementing the PAM4 protocol, the level detection circuit determines in which of 4 possible ranges the detected voltage falls, and compares the detected value to a predetermined value associated with one of the four possible ranges. In particular, if a detected value of the input signal is determined to be greater than $+2h_0$, then the $+3h_0$ voltage value will be used as the reference value input to the error detector. If a detected value of the input signal is determined to be between 0 and $+2h_0$, then the $+h_0$ voltage value will be used as the reference value input to the error detector. If a detected value of the input signal is determined to be between 0 and $-2h_0$, then the $-h_0$ voltage value will be used as the reference value input to the error detector. Finally, if a detected value of the input signal is determined to be less than $-2h_0$, then the $-3h_0$ voltage value will be used as the reference value input to the error detector.

The circuit of FIG. 2 may be modified to correct any undesired offset or to adjust the amplitude of a received signal transmitted using the PAM4 control protocol, as shown in FIGS. 13 and 14. In particular, a selection circuit 1302 controlled by a control signal on a signal line 1304 selects one of four inputs $3h_0$, $-h_0$, $h_0$ or $3h_0$ on signal lines 1306 in order to provide the correct reference voltage to the error detector 322. Accordingly, the calibration circuit 340 is able to select the correct reference value and to make a determination as to whether a signal is greater than or less than a reference signal, for four possible levels of an input signal, rather than the two possible levels as described in FIGS. 3 and 4. Alternatively, four error detectors could be used, where, in addition to the detector 322 which receives the $3h_0$ reference signal, a second detector 1402 has a first input 1404 coupled to receive an input signal by way of a signal line 1406 and a second input 1408 coupled to receive the reference voltage $h_0$. The error detector 1402 generates an error detector signal at an output 1409. A third detector 1412 has a first input 1414 coupled to receive an input signal by way of a signal line 1416 and a second input 1418 coupled to receive the reference voltage $-h_0$. The error detector 1412 generates an error detector signal at an output 1419. Finally, a fourth detector 1422 has a first input 1424 coupled to receive an input signal by way of a signal line 1426 and a second input 1428 coupled to receive the reference voltage $h_0$. The error detector 1422 generates an error detector signal at an output 1429. A selection circuit 1430 is coupled to the outputs of each of the delay elements 1432-1438 at the corresponding outputs of the error detectors. The control circuit selects the correct output of the error detectors, as set forth above.

It should be understood that a determination of whether an input signal has an offset or requires an amplitude correction can be based upon two adjacent signals having different voltage levels. That is, any of the conditions of FIGS. 6-9 could exist with respect to any two of the voltages $3h_0$, $h_0$, $-h_0$, and $-3h_0$, where the relationship of the detected signal with those two voltages would indicate which of the cases 1-4 exist, and therefore which type of correction signal would be required.

Figure 15:
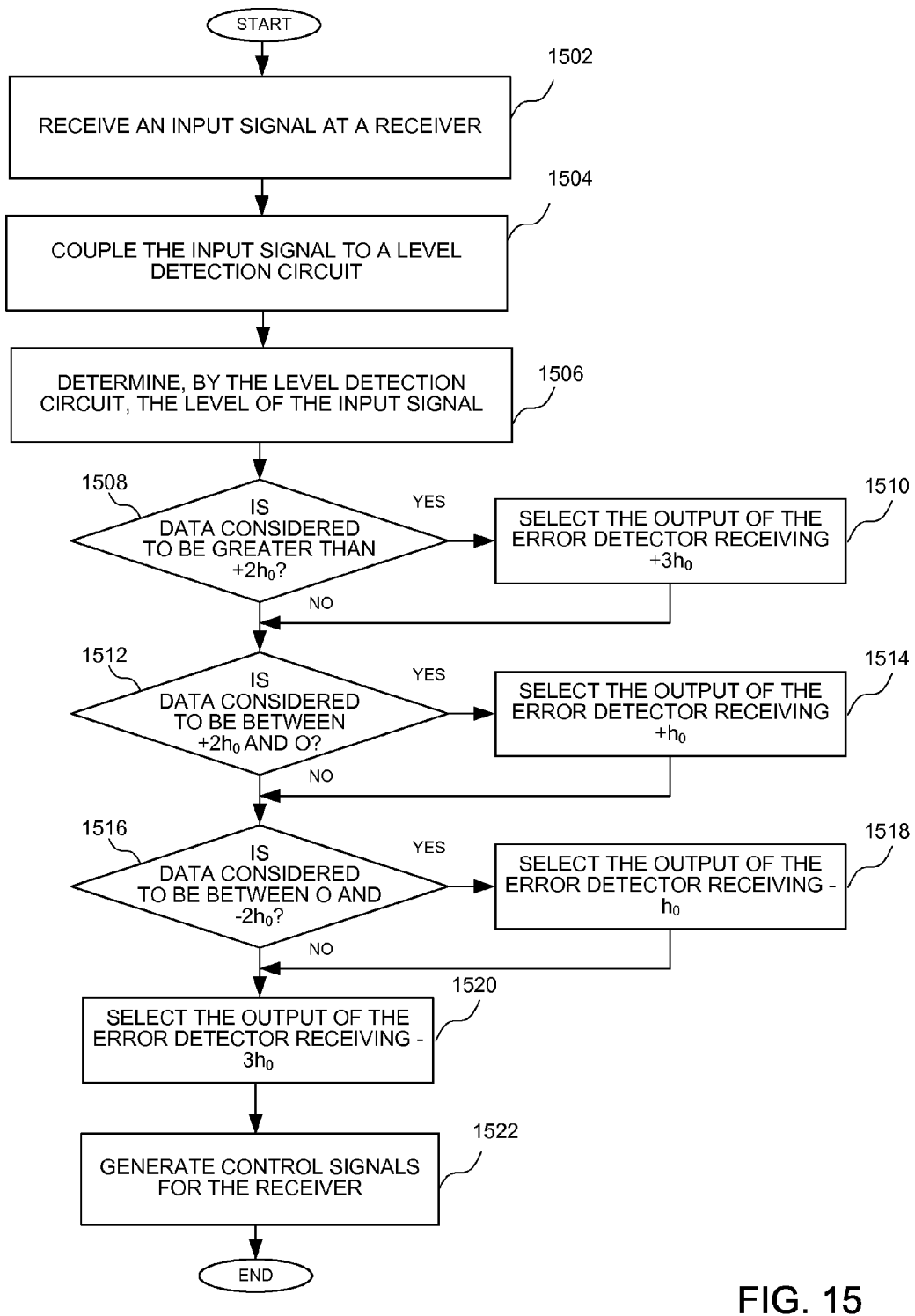
FIG. 15 is a flow chart showing another method of correcting baseline wander when receiving data.

Turning now to FIG. 15, a flow chart shows another method of correcting baseline wander when receiving data, and particularly, receiving PAM4 data as shown in FIGS. 13 and 14. An input signal is received at a receiver at a block 1502, and is coupled to a level detection circuit at a block 1504. An output of the level detection circuit is generated at a block 1506. A circuit implementing the method, such as the level detection circuit of FIGS. 13 and 14, determines whether a detected value of the input signal is near a voltage level of the four possible voltage levels of a received signal to enable a control circuit, such as control circuit 340 of FIGS. 13 and 14, to determine the relative values (i.e. either greater than or less than) of a detected voltage level and a reference value.

In particular, it is determined if detected data is greater than a value of $2h_0$ at a block 1508. If so, the output of the error detector receiving the reference signal $+3h0$ is selected at a block 1510. If not, it is then determined if detected data is between a value of $2h_0$ and 0 at a block 1512. If so, the output of the error detector receiving the reference signal $+h0$ is selected at a block 1514. If not, it is then determined if detected data is between a value of 0 and $-2h_0$ at a block 1516. If so, the output of the error detector receiving the reference signal $-h_0$ is selected at a block 1518. Otherwise, the detected value of the signal is considered to be below a value of $-2h_0$, and the output of the error detector receiving the $-3h_0$ value is selected at a block 1520. Control signals for the receiver are then generated at a block 1522. The control signals are generated based upon the evaluation of the input signal relative to two reference signals to determine whether any of the cases of FIG. 5 exists. While the method of FIG. 15 is directed to a receiver implementing a PAM4 protocol, it should be understood that the method would apply to any number of received values.

The methods of FIGS. 11 and 15 could be implemented using any of the circuits set forth above, or other suitable circuits. While specific blocks associated with the methods of FIGS. 11 and 15 are shown, it should be understood that other blocks of the methods or additional details related to the subject matter of a specific block could be found in the description of the circuit for receiving data.

It should be understood that many iterations can be performed, where adjustments may be made to correct an offset or change the amplitude of a signal. Accordingly, either an offset control signal or an amplitude control signal may be generated, where different control signals are generated until the input signal reaches as steady state. For example, the offset of the signal may be corrected twice, followed by an amplitude correction. As data is received, the control circuit will periodically check the input signal to determine whether an offset control signal or an amplitude control signal is necessary to correct the input signal.

It can therefore be appreciated that new circuits for and methods of receiving data has been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A circuit for receiving data in an integrated circuit, the circuit comprising:
   a receiver configured to receive an input signal and to generate output data based upon the input signal, the receiver having a level detection circuit coupled to receive the input signal; and
   a calibration circuit coupled to the receiver, the calibration circuit having:
   an input for receiving the input signal;
   an error detection circuit coupled to the input, the error detection circuit coupled to receive the input signal, a first reference voltage and a second reference voltage; and
   a control circuit coupled to an output of the error detection circuit, wherein the control circuit selectively generates either an offset control signal or an amplitude control signal based upon comparisons of the input signal to the first reference voltage and the second reference voltage.

2. The circuit of claim 1, wherein the first reference voltage comprises a high level reference voltage and the second reference voltage comprises a low level reference voltage.

3. The circuit of claim 1, wherein the receiver comprises a receiver for receiving NRZ signals.

4. The circuit of claim 1, wherein the error detection circuit comprises a first error detector and a second error detector, wherein the first error detector is coupled to receive the first reference voltage and the second error detector circuit is coupled to receive the second reference voltage.

5. The circuit of claim 1, wherein the receiver comprises a receiver for receiving PAM4 signals.

6. The circuit of claim 5, further comprising a selection circuit coupled to receive four reference voltages associated with received signal levels of the PAM4 signals.

7. The circuit of claim 1, wherein the control circuit generates:
   an offset control signal that enables negative offset correction if a first value of a received signal is greater than the first reference voltage and a second value of the received signal is greater than the second reference voltage;
   an offset control signal that enables positive offset correction if the first value of the received signal is less than the first reference voltage and the second value of the received signal in less than the second reference voltage;
   an amplitude control signal that increases the amplitude of the input signal if the first value of the received signal is less than the first reverence voltage and the second value of the received signal is greater than the second reference voltage; or
   an amplitude control signal that decreases the amplitude of the input signal if the first value of the received signal is greater than the first reverence voltage and the second value of the received signal is less than the second reference voltage.

8. A circuit for receiving data in an integrated circuit, the circuit comprising:
   a receiver configured to receive an input signal and to generate output data based upon the input signal, the receiver having a level detection circuit coupled to receive the input signal; and
   a calibration circuit coupled to the receiver, the calibration circuit having:
   an input for receiving the input signal;
   an error detector coupled to the input, the error detector coupled to receive the input signal and a reference voltage;
   a selection circuit coupled to receive a plurality of reference voltages, wherein the reference voltage coupled to the error detector is generated at an output of the selection circuit; and
   a control circuit coupled to an output of the error detector.

9. The circuit of claim 8 wherein the selection circuit is a coupled to receive a first reference voltage of the plurality of reference voltages associated with a voltage value of a top of an eye pattern associated with the input data and a second reference voltage of the plurality of reference voltages associated with a voltage value of a bottom of the eye pattern.

10. The circuit of claim 8 wherein the receiver comprises a receiver for receiving signals having four voltage levels including a first voltage level, a second voltage level, a third voltage level and a fourth voltage level, the four voltage levels increasing from the first voltage level to the fourth voltage level.

11. The circuit of claim 10 wherein the level detection circuit determines whether a detected value of the input signal is near a voltage level of the four voltage levels.

12. The circuit of claim 11 wherein a control signal generated by the control circuit is coupled to the selection circuit to select a voltage level of the four voltage levels which is closest to a detected value of the input signal.

13. The circuit of claim 12 wherein the control circuit generates either an offset control signal or an amplitude control signal based upon outputs of the error detector and the output data of the receiver.

14. The circuit of claim 13 wherein the control circuit generates an offset control signal or an amplitude control signal based upon a comparison of detected values of the input signal to two of the four voltage levels.

15. A method of receiving data in an integrated circuit, the method comprising:
- receiving an input signal at a receiver;
- coupling the input signal to a level detection circuit and an error detection circuit;
- generating a first output of the error detection circuit, wherein the first output of the error detection circuit is based upon a comparison of the input signal and a first reference voltage;
- generating a second output of the error detection circuit, wherein the second output of the error detection circuit is based upon a comparison of the input signal and a second reference voltage;
- coupling the outputs of the level detection circuit and the first and second outputs of the error detection circuit to a control circuit; and
- selectively generating either an offset control signal or an amplitude control signal based upon the first and second outputs of the error detection circuit.

16. The method of claim 15 wherein receiving an input signal comprises receiving NRZ signals, and the first reference voltage comprises a high level reference voltage and the second reference voltage comprises a low level reference voltage.

17. The method of claim 15, wherein generating a first output of the error detection circuit comprises generating the first output of the error detection circuit based upon comparison of the input signal with the first reference voltage at a first error detector and generating a second output of the error detection circuit comprises generating a second output based upon comparison of the input signal with the second reference voltage at a second error detector.

18. The method of claim 15 further comprising selecting one of a plurality of reference voltages to be compared to an input signal.

19. The method of claim 15 wherein coupling the input signal to a error detection circuit comprises coupling the input signal to a plurality of error detectors of the error detection circuit.

20. The method of claim 15, wherein selectively generating either an offset control signal or an amplitude control signal comprises generating:
- an offset control signal that enables negative offset correction if a first value of a received signal is greater than the first reference voltage and a second value of the received signal is greater than the second reference voltage;
- an offset control signal that enables positive offset correction if the first value of the received signal is less than the first reference voltage and the second value of the received signal in less than the second reference voltage;
- an amplitude control signal that increases the amplitude of the input signal if the first value of the received signal is less than the first reverence voltage and the second value of the received signal is greater than the second reference signal; or
- an amplitude control signal that decreases the amplitude of the input signal if the first value of the received signal is greater than the first reverence voltage and the second value of the received signal is less than the second reference voltage.

* * * * *